(12) United States Patent
Genetti et al.

(10) Patent No.: US 8,099,192 B2
(45) Date of Patent: Jan. 17, 2012

(54) METHOD AND APPARATUS FOR TEACHING A WORKPIECE TRANSFER ROBOT

(75) Inventors: Damon Genetti, Livermore, CA (US); Heinrich Von Bunau, San Jose, CA (US); Tarek Radwan, Santa Clara, CA (US); Karen Townsend, Santa Clara, CA (US)

(73) Assignee: Novellus Systems, Inc., San Jose, CA (US)

( * ) Notice: Subject to any disclaimer, the term of this patent is extended or adjusted under 35 U.S.C. 154(b) by 1106 days.

(21) Appl. No.: 11/935,883

(22) Filed: Nov. 6, 2007

(65) Prior Publication Data

US 2009/0118862 A1 May 7, 2009

(51) Int. Cl.
*G05B 19/18* (2006.01)

(52) U.S. Cl. .......... 700/254; 700/86; 700/186; 700/252; 700/253; 700/247; 318/568.1; 318/568.11; 318/568.13; 318/568.16; 318/568.19; 901/1; 901/2; 901/3; 901/4; 901/6; 414/730; 414/744.3; 414/744.5; 414/744.6; 414/901; 219/124.34; 219/125.1

(58) Field of Classification Search ............ 701/86, 701/186, 252, 253, 245, 247, 248, 251, 254.255, 701/257, 258, 259, 260, 261, 262, 264; 318/568.1, 318/568.11, 568.13, 568.16, 568.19, 567, 318/573; 901/1, 2, 3, 4, 6, 8, 15, 27, 30, 901/32, 42, 47; 414/730, 744.3, 744.5, 744.6, 414/901, 935, 936, 937, 941; 219/124.34, 219/125.1

See application file for complete search history.

(56) References Cited

U.S. PATENT DOCUMENTS

| | | | | |
|---|---|---|---|---|
| 4,807,144 A * | 2/1989 | Joehlin et al. | ........... | 700/205 |
| 5,376,786 A * | 12/1994 | MacDonald | ........... | 250/227.12 |
| 5,905,351 A * | 5/1999 | Morishita et al. | ........... | 318/606 |
| 6,468,384 B1 | 10/2002 | Singh et al. | | |
| 6,934,606 B1 | 8/2005 | Genetti et al. | | |
| 7,049,542 B2 * | 5/2006 | Wright et al. | ........... | 219/121.63 |
| 7,959,403 B2 * | 6/2011 | van der Meulen | ........... | 414/805 |
| 2003/0231299 A1 * | 12/2003 | Schneider | ........... | 356/139.06 |
| 2005/0021177 A1 * | 1/2005 | Bacchi et al. | ........... | 700/245 |
| 2005/0137751 A1 * | 6/2005 | Cox et al. | ........... | 700/245 |
| 2006/0045719 A1 * | 3/2006 | Bacchi et al. | ........... | 414/744.5 |
| 2006/0113459 A1 * | 6/2006 | Yang et al. | ........... | 250/208.1 |
| 2007/0009354 A1 * | 1/2007 | Zahuranec | ........... | 415/206 |
| 2007/0210717 A1 * | 9/2007 | Smith et al. | ........... | 315/111.51 |
| 2008/0019679 A1 * | 1/2008 | Kubo | ........... | 392/416 |

* cited by examiner

*Primary Examiner* — James Trammell
*Assistant Examiner* — McDieunel Marc
(74) *Attorney, Agent, or Firm* — Weaver Austin Villeneuve & Sampson LLP (57) ABSTRACT

A method is provided for teaching a transfer robot used in conjunction with a workpiece processing system including a pedestal assembly, a light sensor having an optical input fixedly coupled to the pedestal assembly, a transfer robot having an end effector, and a processing chamber containing the pedestal assembly and light sensor. The method includes the steps of producing light within the processing chamber, moving the end effector over the optical input such that amount of light reaching the light sensor varies in relation to the position of the end effector, and recording the signal gain as the end effector is moved over the optical input. The method also includes the step of establishing from the recorded signal gain a desired position of the end effector relative to the pedestal assembly.

22 Claims, 7 Drawing Sheets

METHOD AND APPARATUS FOR TEACHING A WORKPIECE TRANSFER ROBOT

FIELD OF THE INVENTION

The present invention generally relates to a workpiece processing system and, more particularly, to a method and apparatus for teaching a workpiece transfer robot employed in such a processing system.

BACKGROUND OF THE INVENTION

Workpiece processing systems commonly employ vacuum transfer robots to transfer workpieces (e.g., semiconductor wafers) from one or more sub-atmospheric storage receptacles (e.g., load locks) to a processing chamber, or between processing chambers. The vacuum transfer robot, which may reside within a transfer chamber positioned between the load locks and a processing chamber, includes an extendable arm having an end effector attached thereto. To move a selected workpiece from a load lock into a processing chamber, the transfer robot first extends its arm into the load lock and picks up the selected wafer such that the wafer rests on the end effector. The vacuum transfer robot then retracts its arm, rotates to point its arm toward the processing chamber, and extends its arm into the processing chamber. To complete the transfer process, the robot places the workpiece on a pedestal assembly (e.g., an electrostatic chuck) located within the processing chamber. After the transfer process has been completed, the robot's arm is retracted from the processing chamber, certain operating conditions are created in the processing chamber (e.g., high temperatures and near-vacuum pressure levels), and processing commences.

It is important for the overall success of the processing step that the workpiece transfer robot is capable of repeatedly and reliably placing a workpiece at a precise location on the processing chamber pedestal assembly. Thus, to ensure that the robot's movements are accurately coordinated with the physical layout of the particular processing system in which the robot is employed, the workpiece transfer robot undergoes a teaching process prior to workpiece processing. In conventional robot teaching processes, the transfer chamber and processing chamber are vented to atmosphere, the lids are opened, and a fixture is placed on the pedestal assembly. Utilizing the fixture as a reference point, an operator moves the robot's end effector to an ideal workpiece transfer position, either manually or via a "teach pad" remote control, and the end effector's coordinates are recorded. The robot's controller is then programmed to move the end effector to the coordinates corresponding to the ideal transfer position before placing a workpiece on the processing chamber pedestal assembly.

Although conventional transfer robot teaching processes of the type described above are generally sufficient for teaching a robot an ideal workpiece transfer position, such processes may be subject to inaccuracies in determining the ideal workpiece transfer position. For example, such conventional teaching processes rely on an operator to position the robot's end effector and pedestal fixture and may consequently be subject to human error. More importantly, such conventional teaching processes are performed with the chambers' lids open and, therefore, cannot be carried out under normal operating conditions. As a result, conventional transfer robot teaching processes are unable to compensate for thermal expansion and deflection resulting from the high temperatures and sub-atmospheric pressures experienced during actual workpiece processing. Moreover, in the event that a workpiece transfer robot becomes misaligned during workpiece processing, conventional teaching processes generally require that the processing chamber is cleaned, cooled, and vented before the transfer robot may be re-trained and workpiece processing resumed.

In view of the above, it would be desirable to provide a method and apparatus for teaching a workpiece transfer robot that overcomes the above-noted disadvantages. In particular, it would be desirable if such a teaching method were capable of being performed at or near normal certain operating conditions to reduce inaccuracies introduced by thermal expansion and vacuum deflection. It would also be desirable if such a teaching method eliminated the need for manually-placed fixtures and for cleaning, cooling, and venting the processing chamber to re-train the workpiece transfer robot. Finally, it would be desirable if the teaching method utilized one or more sensors (e.g., a light sensor, such as a pyrometer) pre-existing in a conventional processing chamber. Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

Figure 1:
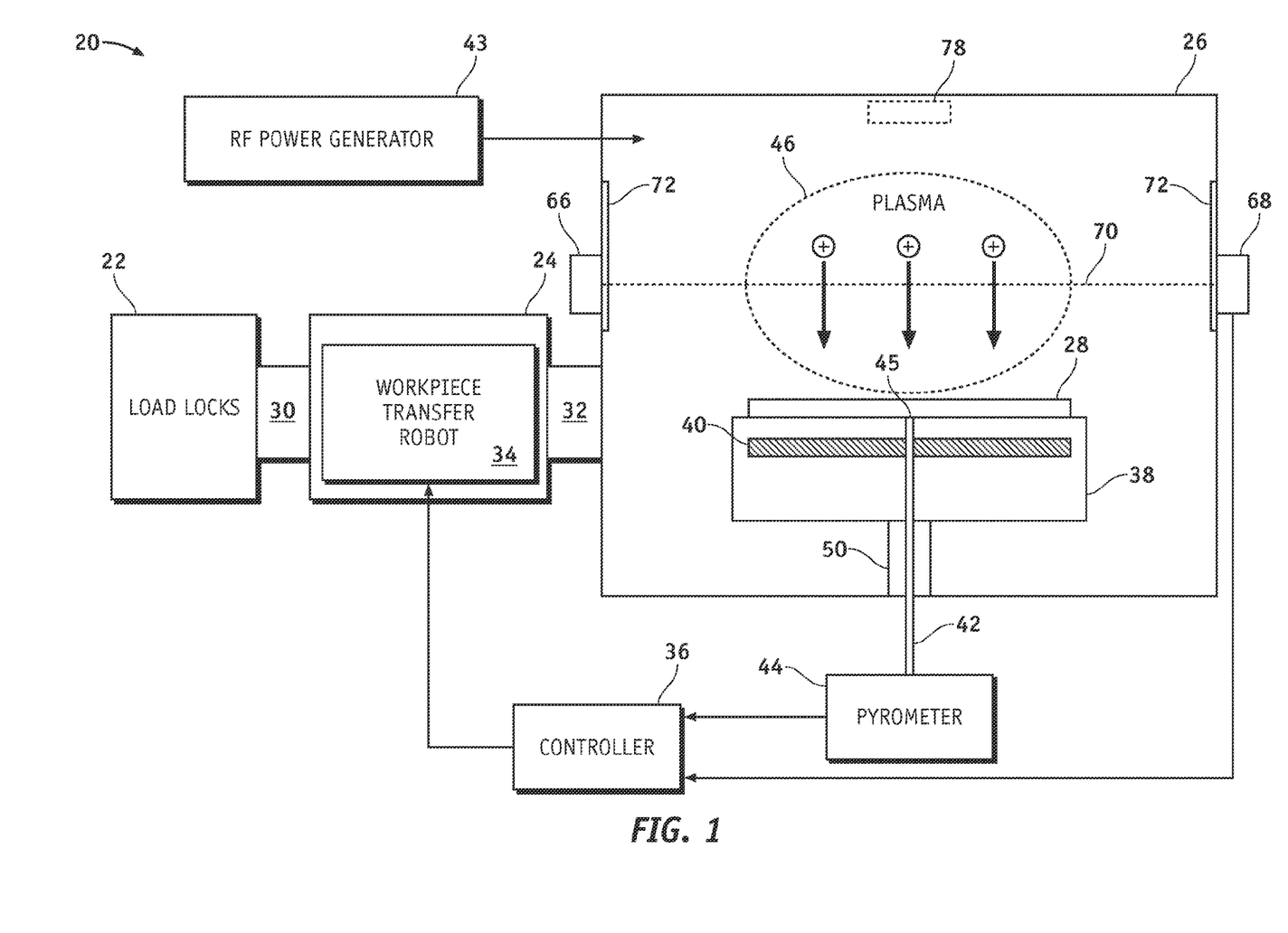
FIG. 1 is a functional block diagram of an exemplary workpiece processing system.

The following detailed description of the invention is merely exemplary in nature and is not intended to limit the invention or the application and uses of the invention. Furthermore, there is no intention to be bound by any theory presented in the preceding background of the invention or the following detailed description of the invention. In FIG. 1 and in the attendant description, a plasma processing chamber is shown and described for illustrative purposes. This example notwithstanding, it should be understood that the teaching method described herein is equally applicable to other types of workpiece processing chambers.

FIG. 1 is a functional block diagram of an exemplary workpiece processing system 20 including at least one load lock 22, a transfer chamber 24, and a processing chamber 26 suitable for processing a workpiece, such as a semiconductor wafer 28. Load lock 22 is coupled to transfer chamber 24 via at least a first valve 30, and transfer chamber 24 is coupled to plasma processing chamber 26 via a second valve 32. A workpiece transfer robot 34 resides within transfer chamber 24 and transfers workpieces from load lock 22 to a pedestal assembly 38 (e.g., an electrostatic chuck, a vacuum chuck, a heated pedestal, etc.) located within processing chamber 26. Alternately, workpiece transfer robot 34 may transfer workpieces from processing chamber 26 to another processing chamber (not shown). At least one controller 36 is operably coupled to workpiece transfer robot 34 and may automate the movements thereof. In addition, controller 36 may regulate the various aspects of processing as described below. Controller 36 may comprise (or be associated with) any number of individual microprocessors, memories, power supplies, storage devices, interface cards, and other standard components known in the art. Controller 36 may also include or cooperate with any number of software programs or instructions designed to carry out the various methods, process tasks, calculations, and control functions described below. Furthermore, although controller 36 is referred to herein in the singular, it will be appreciated that controller 36 may in fact comprise a plurality of controllers that communicate as a cooperative network.

Workpiece processing system 20 further comprises a light sensor having an optical input fixedly coupled to processing chamber pedestal assembly 38. In a preferred embodiment, the light sensor may comprise a pyrometer 44 that includes a light pipe 42 (e.g., a fiber optic cable), which extends upward through pedestal assembly 38. In particular, an optical input 45 of light pipe 42 is mounted proximate the upper surface of pedestal assembly 38. As indicated in FIG. 1, optical input 45 is preferably disposed in a central portion of pedestal assembly 38 and will consequently be described as such herein below. However, it should be appreciated that, in alternative embodiments, the disposition of optical input 45 within pedestal assembly 38 may be varied as desired. During processing, light is produced by a light source provided beneath wafer 28. For example, light may be produced by an optical emitter associated with pyrometer 44 and mounted within pedestal assembly 38. The light is reflected from the lower surface of wafer 28 and into optical input 45 of light pipe 42. The light then propagates through pipe 42 to an optical sensor (e.g., an emissivity sensor) provided in pyrometer 44. Utilizing the emissivity sensor, pyrometer 44 measures characteristics of the reflected light to determine the reflectivity, and thus the temperature, of semiconductor wafer 28. After semiconductor wafer 28 has been placed on pedestal assembly 38, processing conditions are produced in chamber 26 (e.g., high temperatures, plasma and sub-atmospheric pressure levels) and processing commences. If chamber 26 is a plasma processing chamber, workpiece processing may involve the creation of plasma above workpiece 28 via the energizing of one or more radiofrequency power generators (e.g., RF power generator 43) as generally indicated in FIG. 1 at 46.

Figure 2:
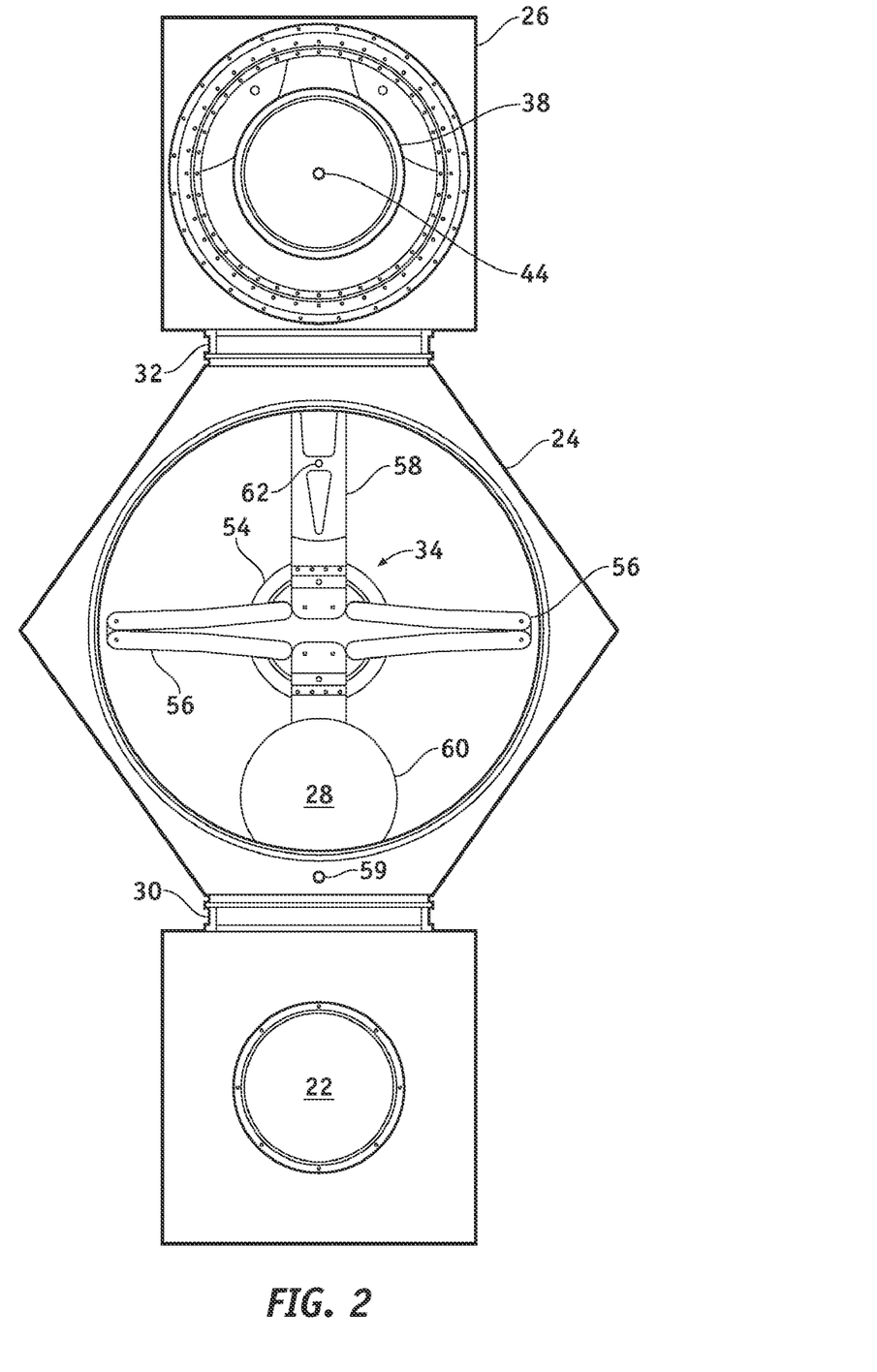
FIGS. 2 and 3 are top plan views of an exemplary workpiece transfer robot in retracted and extended positions, respectively.
Figure 3:
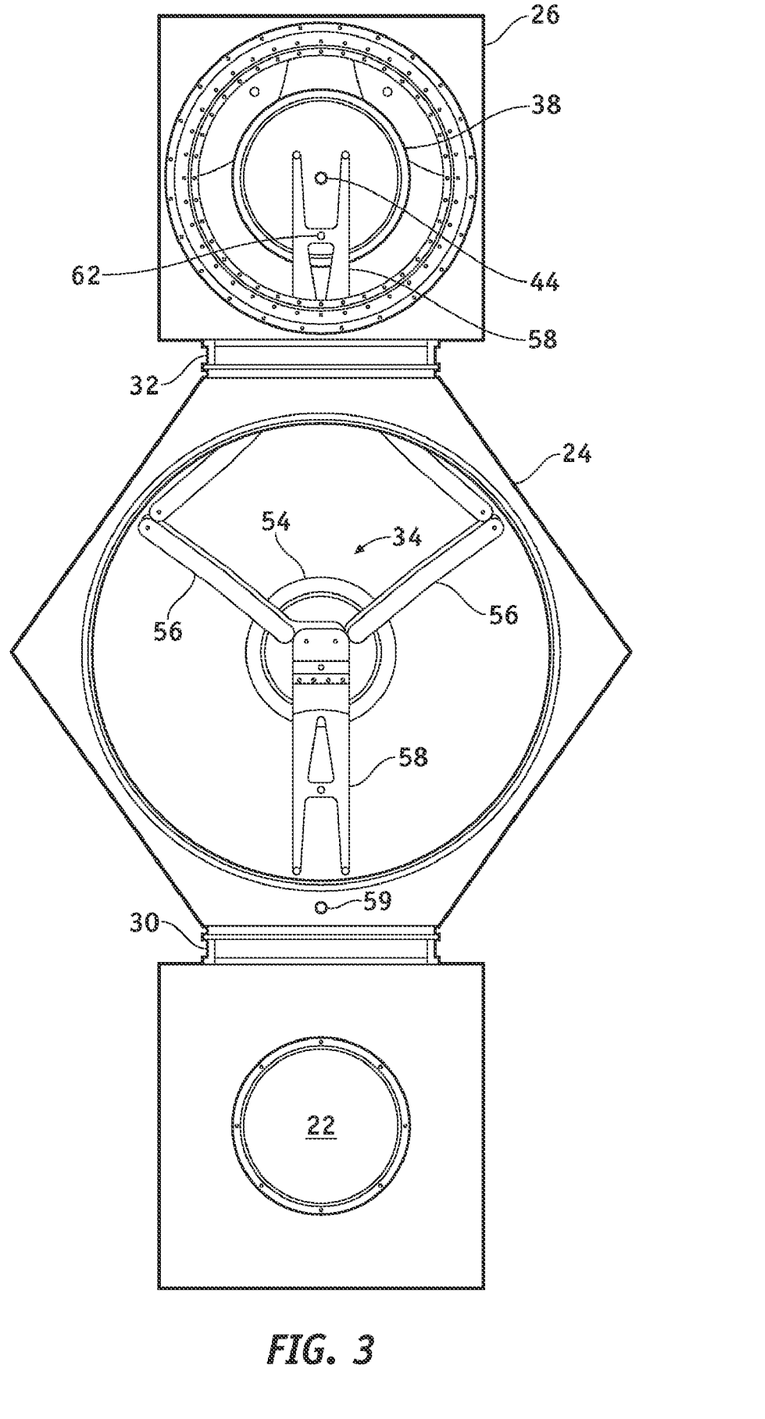

As noted above, a workpiece transfer robot 34 resides within transfer chamber 24 and moves a selected workpiece, such as semiconductor wafer 28, from load lock 22 to processing chamber 26 (or between processing chamber 26 and another processing chamber). FIGS. 2 and 3 are top plan views of exemplary workpiece transfer robot 34 in retracted and extended positions, respectively. In these views, it can be seen that workpiece transfer robot 34 comprises a central hub 54 having at least one extendable arm 56 rotatably coupled thereto. An end effector 58 is coupled to the distal end of extendable arm 56 and is configured to selectively support a workpiece as generally shown in FIG. 2 at 60. In a preferred embodiment, workpiece transfer robot 34 is a vacuum transfer robot; however, it will be appreciated that workpiece transfer robot 34 may comprise any device suitable for transporting a workpiece from load lock 22 to processing chamber pedestal assembly 38 or between multiple processing chambers. To better determine the rotational position of workpiece transfer robot 34, one or more wafer presence sensors 59 may be disposed within transfer chamber 24 and project a beam that is broken by end effector 58 as robot 34 rotates between different rotational positions.

In a preferred embodiment, end effector 58 includes at least one physical feature that serves as a reference point for determining the positioning of end effector 58. This physical feature may comprise any structural element (e.g., a strip of reflective tape) having different optical characteristics (e.g., a different reflectivity or translucency) than surrounding portions of end effector 58. In the illustrated exemplary embodiment, this physical feature is an opening 62 provided through a central portion of end effector 58 (the term "central portion" denotes the portion of end effector 58 that aligns with the center of a workpiece supported by end effector 58); although it will be appreciated that, in alternative embodiments, the structural element (e.g. opening 62) may not be located in a central portion of the end effector. As a non-limiting example, opening 62 may be a circular aperture having a diameter of approximately ½ inch. Opening 62 has different optical characteristic than the surrounding portions of end effector 58 in the sense that, if light is produced above end effector 58, opening 62 will permit the passage of light while the surrounding portions of end effector 58 block the passage of light. Conversely, if light is produced by a light source positioned beneath end effector 58 (e.g., pyrometer 44), opening 62 will permit the passage of light through end effector 58 while the surrounding portions of end effector 58 will reflect the light back toward the light source. Stated differently, when light is produced beneath end effector 58, opening 62 will exhibit a low (or null) reflectivity while the surrounding portions of end effector 58 will exhibit a high reflectivity.

Figure 4:
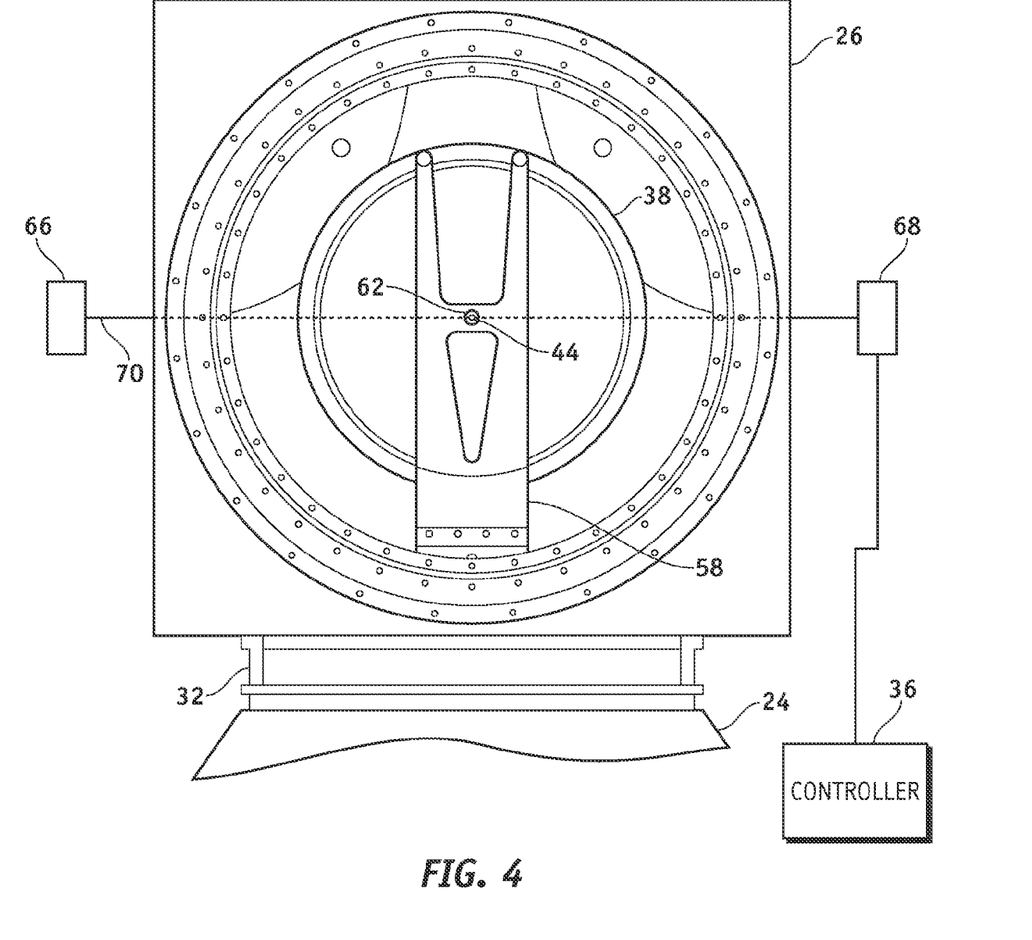
FIG. 4 is a detailed top plan view of the end effector of the workpiece transfer robot shown in FIGS. 2 and 3 in an exemplary optimal transfer position wherein the end effector is centered with respect to the processing chamber pedestal assembly.

In a specific embodiment, to transfer a selected workpiece from load lock 22 to processing chamber pedestal assembly 38, workpiece transfer robot 34 first picks up the selected workpiece from load lock 22 and returns to its retracted position as generally indicated in FIG. 2. Transfer robot 34 then rotates extendable arm 56 to point arm 56 toward valve 32 and processing chamber 26. Next, arm 56 is extended through valve 32 such that end effector 58, and the workpiece carried thereby, enter processing chamber 26 as shown in FIG. 3 (the workpiece is not shown for clarity). When end effector 58 reaches a predetermined transfer position, robot 34 places the workpiece onto processing chamber pedestal assembly 38. The workpiece may be placed directly on the top surface of pedestal assembly 38 or it may be placed onto lift pins, ceramic springs or other support structures. It is desirable that workpiece transfer robot 34 accurately positions semiconductor wafer 28 (or other such workpiece) at a precise location on processing chamber pedestal assembly 38. To ensure that a precise hand-off is accomplished, transfer robot 34 is taught to move end effector 58 to an ideal transfer position before placing the workpiece on pedestal assembly 38. FIG. 4 illustrates one example of such an ideal transfer position wherein end effector 58 is centered with respect to processing chamber pedestal assembly 38 and opening 62 is concentrically aligned with optical input 45 of pyrometer 44.

The following will describe an exemplary method for teaching a workpiece transfer robot the positioning protocols of a workpiece processing system. For the purposes of illustration, the exemplary robot teaching method will be described in conjunction with workpiece transfer robot 34 (FIGS. 1-4) and the exemplary ideal transfer position shown in FIG. 4 (i.e., wherein the end effector is centered with respect to the pedestal assembly). However, it should be understood that the exemplary robot teaching method may be performed with other types of workpiece processing systems, different transfer positions and with different positioning protocols. Advantageously, the exemplary robot teaching method may determine the position at which a robot's end effector is located with respect to the processing chamber pedestal assembly utilizing components and devices pre-existing in conventional workpiece processing systems. In the context of workpiece processing system 20 (FIG. 1), the position at which end effector 58 is optimally positioned (e.g., centered) with respect to pedestal assembly 38 may be determined utilizing controller 36 and pyrometer 44. For this reason, controller 36, pyrometer 44, and other components utilized to train robot 34 in the manner described below may be collectively referred to as a "transfer robot teaching apparatus". In certain embodiments, the transfer robot teaching apparatus may also include devices not employed in conventional workpiece processing systems. For example, as shown in FIGS. 1 and 4, the transfer robot teaching apparatus may further comprise a through beam sensor including an emitter 66 (e.g., a light emitting diode, a laser, etc.) and a receiver 68, which is coupled to controller 36. Through beam sensor 66, 68 is mounted so as to project a beam 70 through processing chamber 26; e.g., emitter 66 and receiver 68 may be mounted on opposing observation windows 72 as shown in FIG. 1. Beam 70 may be projected over a middle portion of pedestal assembly 38 (most easily appreciated in FIG. 4) at a predetermined height. As described more fully below, controller 36 utilizes through beam sensor 66, 68 to determine the proper hand-off height for workpiece transfer.

Figure 5:
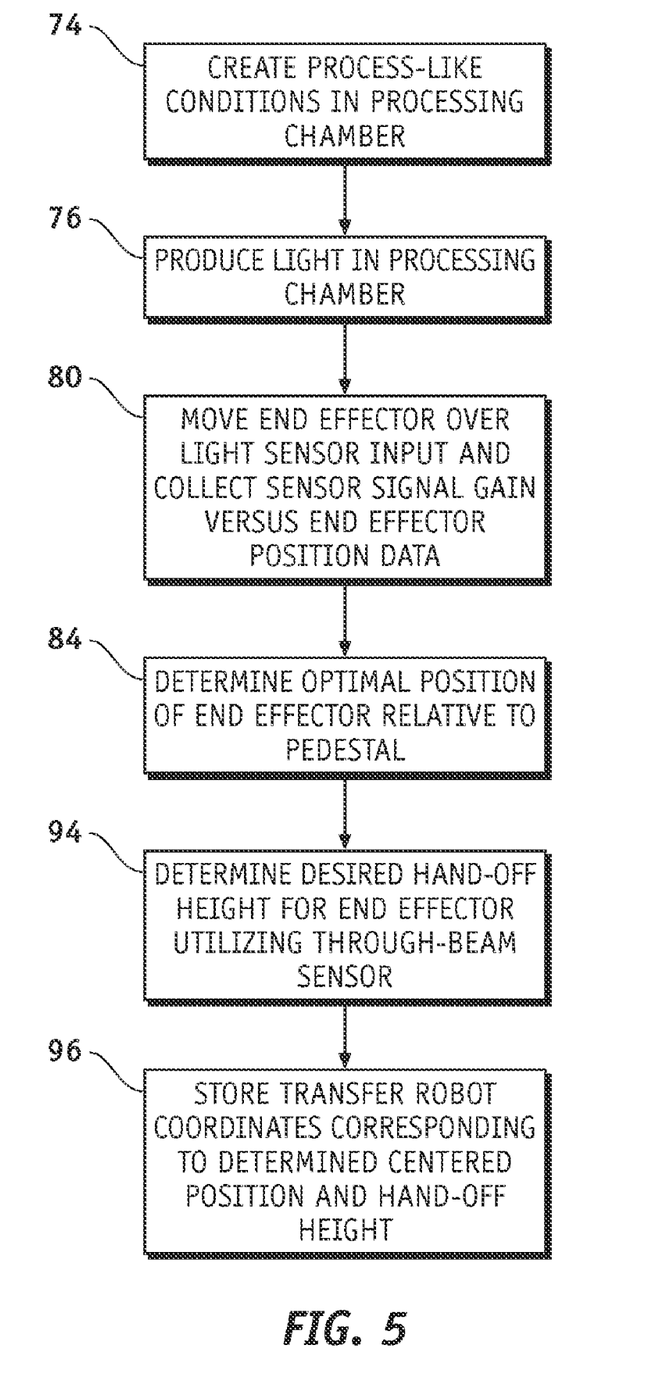
FIG. 5 is a flowchart illustrating a robot teaching method suitable for teaching the robot shown in FIGS. 2-4 in accordance with a second exemplary embodiment.

FIG. 5 is a flowchart illustrating a workpiece transfer robot teaching method in accordance with an exemplary embodiment of the present invention. The exemplary teaching method commences with STEP 74 during which process-like conditions (e.g., high temperature and near-vacuum pressure levels) are created in processing chamber 26. Next, at STEP 76, at least one light source is activated to produce light within processing chamber 26. The term light is defined as any optical output and is not limited to visible light. The optical output may consist of a particular wavelength or range of wavelengths associated with visible, infrared, ultraviolet, or regions of the electromagnetic spectrum. In a preferred embodiment, the light source takes the form of an optical emitter associated with pyrometer 44. Alternatively, the light source may be a plasma 46 created within processing chamber 26 in the manner described above. As a still further alternative, the light source may be a light fixture mounted on the ceiling of processing chamber 26 (e.g., above processing chamber pedestal assembly 38) as generally indicated in FIG. 1 at 78.

After light and process-like conditions have been produced within processing chamber 26, end effector 58 is moved over optical input 45 such that the position of end effector 58 alters the amount of light reaching pyrometer 44 (STEP 80). While end effector 58 is moved in this manner, the signal gain of pyrometer 44 is recorded by controller 36 for multiple end effector positions (as noted above, the rotational position of end effector 58 may be initially be calibrated utilizing wafer presence sensors 59). The response time of pyrometer 44 may be somewhat slower than other conventional sensors (e.g., on the order of approximately 1 second). Therefore, it is preferred that the movements of end effector 58 are performed in a stepped fashion compensating for the minimum pyrometer response time. For example, end effector 58 may be moved to a first position and maintained at the first position for a predetermined time period (e.g., 2 seconds) until controller 36 receives a new signal gain from pyrometer 44 corresponding to the first position. End effector 58 may then be moved to a second subsequent position and maintained there for the predetermined time period until controller 36 receives a new signal gain from pyrometer 44 corresponding to the second position. This process is repeated until controller 36 gathers a set of pyrometer signal gain-versus-end effector position data sufficient to identify the position at which end effector 58 is optimally located with respect to pedestal assembly 38 as described in more detail below.

Figure 6:
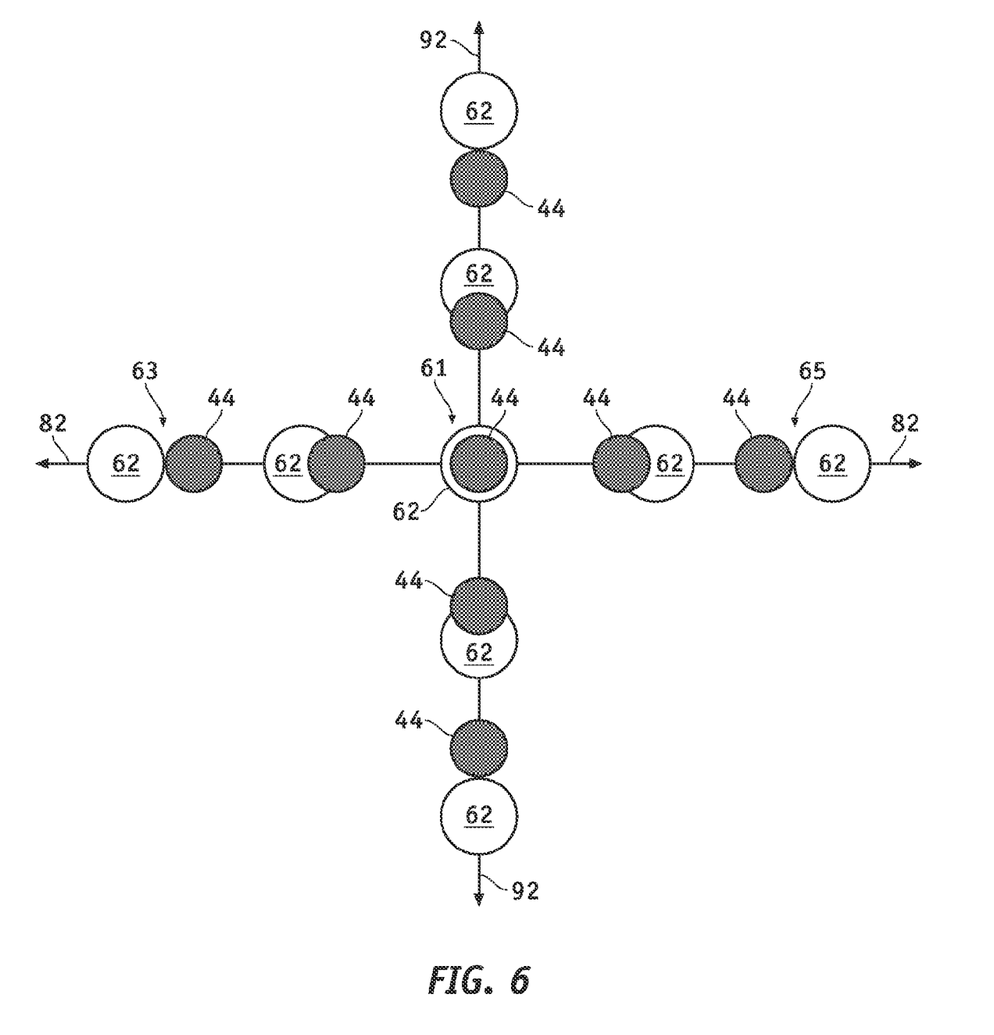
FIG. 6 illustrates one manner in which the end effector of the robot shown in FIGS. 1-4 may be moved over a light sensor, such as the pyrometer shown in FIGS. 1-4, to collect pyrometer signal gain-versus-end effector position data.

FIG. 6 illustrates one manner in which end effector 58 may be moved relative to pedestal assembly 38 during STEP 80 of the exemplary teaching method shown in FIG. 5. For clarity, only opening 62 and optical input 45 of pyrometer 44 are shown in FIG. 6. Again, it should be noted that it is end effector 58 (and, therefore, opening 62) that is moved relative to pedestal assembly 38 (and, therefore, optical input 45). End effector 58 (and, therefore, opening 62) are initially moved along a first path 82, which crosses over optical input 45 of pyrometer 44. End effector 58 may be moved along first path 82 by the rotation of arm 56, in which case first path 82 may be slightly arced. As end effector 58 is moved along path 82, at least one edge of opening 62 sweeps over optical input 45. In a preferred embodiment, end effector 58 is moved along path 82 such that two opposing edges of opening 62 sweep over optical input 45. For example, with reference to FIG. 6, end effector 58 may first be positioned at center position 61 and then moved to the left in stepped increments until reaching a first positional extreme 63. In positional extreme 63, opening 62 is entirely offset (i.e., does not align or overlap with) optical input 45 of pyrometer 44. Next, end effector 58 may be moved to the right (with reference to FIG. 6) in stepped increments past center position 61 until reaching a second positional extreme 65 wherein opening 62 is again offset from optical input 45. Stated differently, the light sensor signal gain is recorded for a first end effector position in which the light sensor input is substantially blocked and for a second end effector position in which the light sensor input is substantially unblocked.

Figure 7:
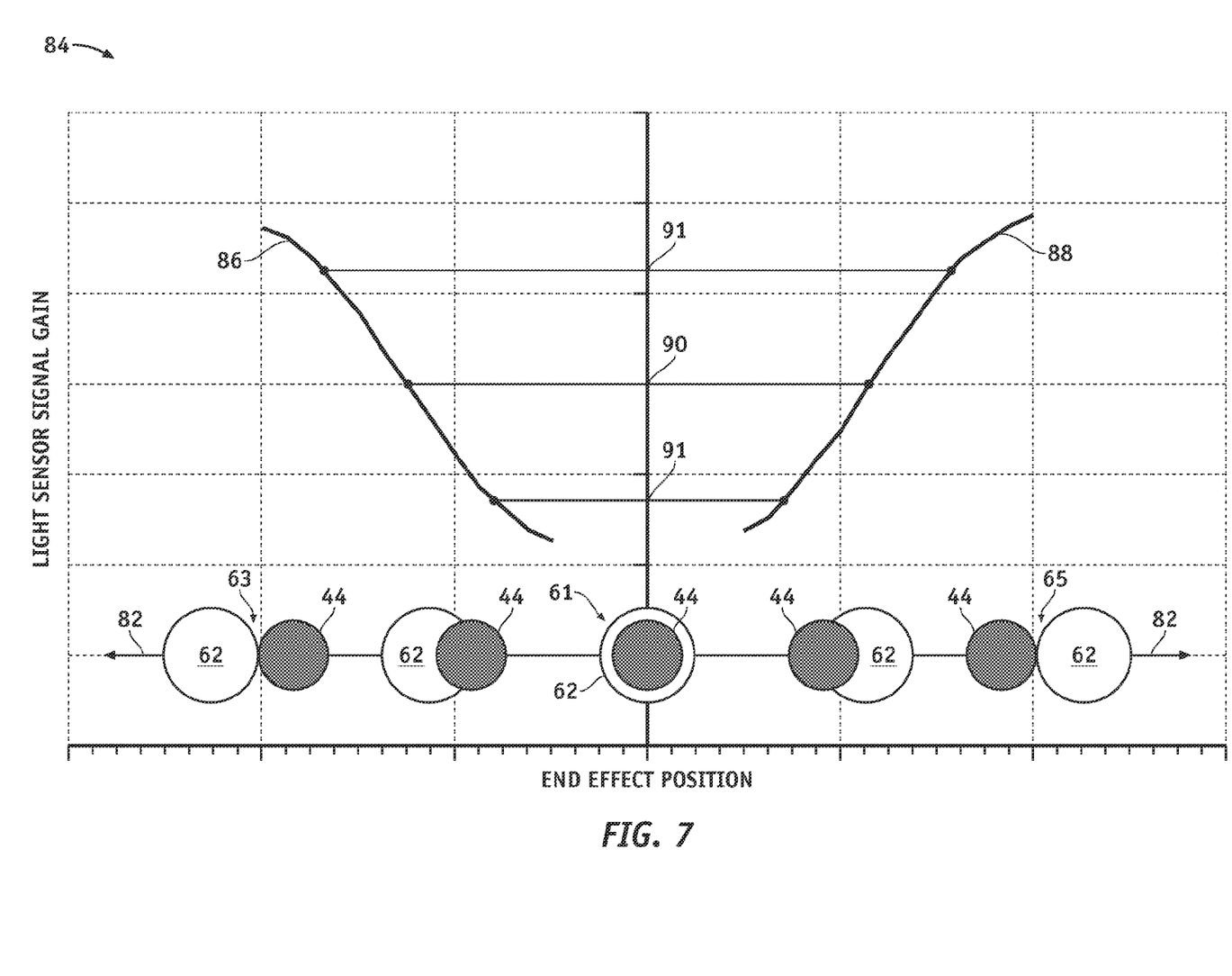
FIG. 7 is a graph illustrating an exemplary relationship between light sensor signal gain (vertical axis) and end effector position (horizontal axis) that may be utilized to identify the position at which the end effector of the robot shown in FIGS. 2-4 is optimally located (e.g., centered) with respect to the processing chamber pedestal assembly shown in FIGS. 2 and 3.

While end effector 58 is being moved in the manner described above, controller 36 records the pyrometer signal gain for multiple end effector positions. Controller 36 then analyzes the resulting pyrometer signal gain-versus-end effector data to determine the position at which end effector 58 is located (e.g., centered) with respect to pedestal assembly 38. To further illustrate this point, FIG. 7 is a graph 84 including an exemplary set of pyrometer signal gain-versus-end effector position data that may be collected as end effector 58 is moved along path 82. In this case, the pyrometer signal gain-versus-end effector position data is expressed as first and second curves 86 and 88. Curve 86 represents the data gathered when end effector 58 is moved from center position 61 to positional extreme 63, and curve 88 represents the data gathered when end effector 58 is moved from center position 61 to positional extreme 65. In this example, it is assumed that light is produced from a source beneath end effector 58, such as an emitter associated with pyrometer 44. As can be seen, when end effector 58 is positioned such that opening 62 is offset (i.e., does not align with) optical input 45 (e.g., when end effector 58 is in positional extreme 63 or 65), a relatively large amount of light is reflected from end effector 58 back to pyrometer 44 and a relatively high signal gain is registered. In contrast, when end effector 58 is positioned such that opening 62 aligns with optical input 45 (e.g., when end effector 58 is proximate center position 61), little to no light is reflected from end effector 58 to pyrometer 44 and low signal gain is registered. Finally, when end effector 58 is positioned such that opening 62 partially overlaps with input 45, a moderate amount of light is reflected from end effector 58 and pyrometer 44 registers an intermediate signal gain.

Controller 36 may identify the position at which opening 62 and optical input 45 of pyrometer 44 (and, therefore, end effector 58 and pedestal assembly 38) are aligned along path 82 by averaging the end effector position for curve 86 and curve 88 for a given pyrometer signal gain (e.g., utilizing a least square method). For example, as indicated in FIG. 7 at 90, the end effector position for curve 86 and curve 88 may be averaged for a pyrometer signal gain of approximately 50% to identify the centered position. If desired, as generally indicated in FIG. 7 at 91, the end effector position may also be averaged at additional pyrometer signal gains for increased accuracy in determining the centered position.

After establishing the position at which opening 62 and optical input 45 are aligned along path 82 (the first centered position), controller 36 may next identify the position at which opening 62 and pyrometer 44 are aligned along a second path 92. As shown in FIG. 6, path 92 may be substantially perpendicular to path 82. To begin, end effector 58 is first returned to center position 61, and subsequently moved along path 92 in incremental steps by, for example, extending arm 56 of transfer robot 34 (FIGS. 2-4). As was the case previously, controller 36 records the pyrometer signal gain for each end effector position. After sufficient pyrometer signal gain-versus-end effector position data has been collected, controller 36 analyzes the data in the manner described above to determine the position at which opening 62 and optical input 45 are aligned along second path 92 (the second centered position). After determining the second centered position, controller 36 may combine the first centered position (as taken along path 82) and the second centered position (as taken along path 92) to establish the position at which opening 62 and optical input 45 (and, therefore, end effector 58 and pedestal assembly 38) are concentrically aligned.

In the foregoing example, it was assumed that the light was produced by a source located beneath end effector 58, such as an emitter associated with pyrometer 44. If the light source is instead positioned above end effector 58, as may be the case if plasma 46 or light fixture 78 is utilized to produce light, a high signal gain will be registered when optical input 45 and opening 62 are aligned and a low signal gain will be registered when optical input 45 and opening 62 are offset. As a result, curves 86 and 88 shown in FIG. 7 will be substantially inverted. This notwithstanding, the position at which opening 62 and optical input 45 are concentrically aligned may still be determined in the manner described above.

Referring once again to the exemplary transfer robot teaching method illustrated in FIG. 5, controller 36 next determines a desired hand-off height for end effector 58 to transfer a workpiece to pedestal assembly 38 (STEP 94). Controller 36 may determine the hand-off height utilizing through beam optical sensor 66, 68. For example, controller 36 may monitor the digital output of receiver 68 to determine the vertical position at which end effector 58 crosses beam 70 (FIGS. 1 and 4) when substantially centered with respect to pedestal assembly 38. Lastly, to complete the exemplary transfer robot teaching method, controller 36 stores the transfer robot coordinates corresponding to the determined centered position and hand-off height (STEP 96). During subsequent workpiece transfer processes, controller 36 may recall the stored coordinates and cause end effector 58 to move thereto before placing a workpiece on pedestal assembly 38. In this manner, controller 36 may ensure that transfer robot 34 repeatedly and reliably places the workpiece on processing chamber pedestal assembly 38 in accordance with the workpiece processing system's positioning protocols.

There has thus been described a method and apparatus for teaching a workpiece transfer robot that may be performed at or near normal certain operating conditions and thus significantly reduces inaccuracies traditionally introduced by thermal expansion and vacuum deflection. The above-described method eliminates the need for manually placed fixtures and utilizes sensors (e.g., a light sensor, such as a pyrometer) that may be pre-existing in a conventional plasma processing chambers. Moreover, because the teaching method may be performed at or near certain operating conditions, the method may be performed without cleaning, cooling, and venting the process chamber to re-train a robot that becomes misaligned during workpiece processing.

While described above in the context of a fully functioning computer system, those skilled in the art will recognize that the mechanisms of the present invention are capable of being distributed as a program product (i.e., a transfer robot teaching program) and, furthermore, that the teachings of the present invention apply to the program product regardless of the particular type of computer-readable media (e.g., floppy disc, hard drive, memory card, optical disc, etc.) employed to carry out its distribution. Although the described above in the context of a plasma processing chamber including a pyrometer, it will be appreciated that the invention is equally applicable to other types of workpiece processing chambers (e.g., non-plasma processing chambers) and other types of conventional light sensors.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for teaching a transfer robot used in conjunction with a workpiece processing system including a pedestal assembly, a light sensor having an optical input fixedly coupled to the pedestal assembly, a transfer robot having an end effector, and a processing chamber containing the pedestal assembly and light sensor, the method for teaching a transfer robot comprising:

producing light within the processing chamber;

moving the end effector over the optical input such that amount of light reaching the light sensor varies in relation to the position of the end effector;

recording the signal gain as the end effector is moved over the optical input; and establishing from the recorded signal gain a desired position of the end effector relative to the pedestal assembly.

2. A method for teaching a transfer robot according to claim 1 wherein the end effector includes an opening therethrough, and wherein the step of moving comprises moving the end effector such that a first edge of the opening sweeps over the optical input.

3. A method for teaching a transfer robot according to claim 2 wherein the step of moving further comprises moving the end effector such that a second edge of the opening sweeps over the optical input, the second edge substantially opposite the first edge.

4. A method for teaching a transfer robot according to claim 2 wherein the light sensor is a pyrometer, and wherein the step of moving comprises moving the end effector over the optical input in stepped movements compensating for the minimum response time of the pyrometer.

5. A method for teaching a transfer robot according to claim 1 further comprising the step of creating partial process-like conditions within the processing chamber prior to moving the end effector over the optical input.

6. A method for teaching a transfer robot according to claim 1 wherein the light sensor includes an optical emitter, and wherein the step of producing light comprises activating the optical emitter.

7. A method for teaching a transfer robot according to claim 1 wherein the processing system further includes a plasma source, and wherein the step of producing light comprises activating the plasma source.

8. A method for teaching a transfer robot according to claim 1 wherein the step of establishing comprises determining from the recorded signal gain the position at which the end effector is centered with respect to the pedestal assembly.

9. A method for teaching a transfer robot according to claim 8 wherein the step of moving comprises moving the end effector along a first path between a first position in which the opening is substantially aligned with the optical input, and a second position in which the opening is offset from the optical input.

10. A method for teaching a transfer robot according to claim 9 further comprising the steps of:
determining a first centered position in which the opening resides over the optical input along the first path; and
moving the end effector along a second path intersecting the first centered position.

11. A method for teaching a transfer robot according to claim 10 wherein the first path is substantially perpendicular to the second path.

12. A method for teaching a transfer robot according to claim 10 wherein the first and second paths comprise rotational and extension paths, respectively, of the transfer robot.

13. A method for teaching a transfer robot according to claim 10 wherein the step of determining comprises the step of averaging first and second end effector positions for a predetermined signal gain value.

14. A method for teaching a transfer robot according to claim 10 further comprising the steps of:
identifying a second centered position in which the opening resides over the optical input along the second path; and
combining the first centered position and the second centered position to determine the position in which the opening is concentrically aligned with the optical input.

15. A method for teaching a transfer robot according to claim 1 wherein the processing system further comprises a through-beam sensor, and wherein the method for teaching a transfer robot further comprises the step of determining hand-off height utilizing the through beam sensor.

16. A program product for use in conjunction with a controller coupled to a workpiece transfer robot having an end effector and to a light sensor having an optical input, the light sensor coupled to a processing chamber pedestal assembly, the program product comprising:
a transfer robot teaching program adapted to:
record sensor signal gain versus end effector position data as the end effector is moved over the optical input; and
determine from the sensor signal gain versus end effector position data the position at which the end effector is optimally located with respect to the pedestal assembly; and
non-transitory computer-readable medium bearing the transfer robot teaching program.

17. A program product according to claim 16 wherein the controller is further coupled to a through beam optical sensor, and wherein the transfer robot teaching program is further adapted to determine a hand-off height utilizing the through beam sensor.

18. A program product according to claim 16 wherein the transfer robot teaching program is further adapted to:
record a first sensor signal gain for an end effector position in which the sensor is substantially blocked;
record a second sensor signal gain for an effector position in which the sensor is substantially unblocked; and
average the first sensor signal gain and the second sensor signal gain.

19. An apparatus for teaching a transfer robot employed within a workpiece processing system of the type which includes a workpiece transfer robot having an end effector and a processing chamber containing a pedestal assembly and a light source, the transfer robot teaching apparatus comprising:
a light sensor having an optical input fixedly coupled to the pedestal assembly;
a through beam sensor coupled to the processing chamber so as to project a beam through the processing chamber; and
a controller coupled to the light sensor, the workpiece transfer robot, and the through beam sensor, the controller configured to:
record light sensor signal gain-versus-end effector position data as the end effector is moved over the optical input and light is produced by the light source;
determine from the recorded light sensor signal gin the position at which the end effector is located with respect to the pedestal assembly; and
determine from the through beam sensor a desired vertical position, of the end effector for workpiece transfer utilizing the through beam optical sensor.

20. An apparatus for teaching a transfer robot according to claim 19 wherein the light sensor comprises a pyrometer.

21. An apparatus for teaching a transfer robot according to claim 19 wherein the through beam sensor comprises one of a laser and a light emitting diode.

22. An apparatus for teaching a transfer robot according to claim 19 wherein the processing chamber includes a first window and a second window substantially opposite the first window, and wherein the through beam sensor comprises:
an emitter mounted on the first window; and
a receiver mounted on the second window and in optical communication with the emitter.

* * * * *